United States Patent Office 3,269,225
Patented August 30, 1966

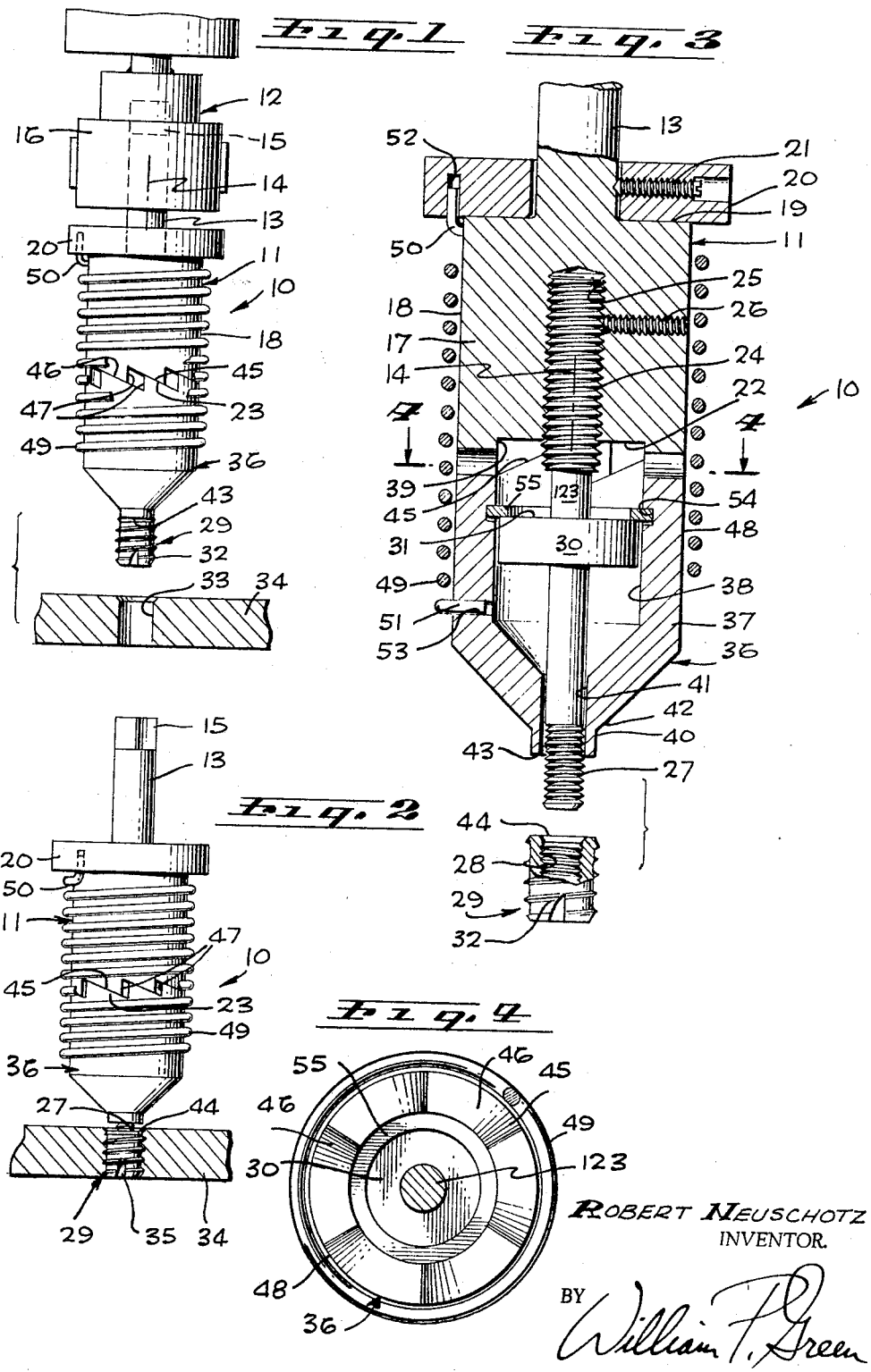

3,269,225
THREADED ELEMENT INSTALLING TOOL
Robert Neuschotz, 1162 Angelo Drive,
Beverly Hills, Calif.
Filed Sept. 3, 1964, Ser. No. 394,223
13 Claims. (Cl. 81—53)

This invention relates to an improved type of tool for installing within a carrier part a threaded element, such as a threaded insert.

When an insert or other threaded element is screwed into a carrier part in a manner such that substantial resistance is offered to the advancement of the insert into position, there is a tendency for the insert to bind on whatever tool is employed for screwing the insert into position, with the result that the insert may tend to be unscrewed from the carrier part as the tool is withdrawn. This may occur, for example, when the insert is a self-tapping type of element, which forms its own threads in the carrier part during installation.

The general object of the present invention is to provide an improved tool for this purpose which is adapted to automatically break any such binding engagement between the tool and an installed element, after installation, and at the initiation of tool withdrawing movement. Especially contemplated is a tool of this type which is structurally very simple, and yet is extremely rugged in construction and capable of functioning over an extended period of time without damage to the force transmitting surfaces of its various moving parts. Further, a tool embodying the invention is completely positive in its driving action, and in its automatic releasing action, is simple to assemble and to disassemble, and is completely reliable in all operational respects.

A tool constructed in accordance with the invention includes a first section which is adapted to be turned about a predetermined axis, and carries threads engageable with mating threads of the element to be installed in a relation holding the element on the tool during installation. A second section of the tool is rotatable with the first section and also free for limited rotation relative thereto, and applies axially inward force to the insert or other threaded element during installation. Each of these sections has a set of teeth projecting axially toward the other section, and more specifically toward the teeth of the other section, with camming surfaces being formed on at least some of the teeth in a manner causing axially inward displacement of the second section against the element to be installed in response to relative rotation of the first section in the direction in which the element is screwed or turned during installation. After installation of the element, the first section of the tool is turned in a reverse unscrewing direction, as a result of which the inclined camming surfaces of the teeth act to immediately release the axial force exerted by the second section against the threaded element, to therefore break any tendency for binding engagement with the element. In addition to the camming surfaces, the two sets of axially projecting interfitting teeth have other surfaces which are engageable and interfit axially in a manner limiting the unscrewing rotary motion of the first section relative to the second section. Preferably, the second section is yieldingly urged in a rotary advancing direction relative to the first section, desirably by a coil spring disposed about the section. Also, the two sections are preferably retained against axial separation far enough to move the teeth out of interfitting engagement, this result desirably being attained by the provision of an enlargement on a threaded shank carried by the first section, which enlargement may be engageable with a snap ring contained within the second section.

The above and other features and objects of the invention will be better understood from the following detailed description of the typical embodiment illustrated in the accompanying drawing, in which:

FIG. 1 is a side view of a tool constructed in accordance with the invention, shown as it appears just prior to installation of an insert into a carrier part;

FIG. 2 is a view similar to FIG. 1, but showing the tool and insert after the insert has been screwed fully into the carrier part;

FIG. 3 is an enlarged axial section through the tool; and

FIG. 4 is a transverse section taken on line 4—4 of FIG. 3.

The insert installing tool 10 shown in the drawing includes a first section 11 adapted to be driven rotatably and axially by an appropriate power operated driving tool 12 (or by a suitable hand tool). Section 11 has an upwardly projecting shank 13 which is centered and turns about the main axis 14 of the tool. At its upper end, shank 13 may have a non-circular, typically square or hexagonal, portion 15 which may be engaged by an appropriate wrench or a socket portion 16 of power operated tool 12, to simultaneously turn and progressively axially advance the tool. At its lower end, shank 13 has an enlargement 17, which may have an externally cylindrical surface 18 centered about axis 14, and a transverse upper end surface 19. An annular collar 20 may be disposed about shank 13 directly above transverse surface 19, and may be free for rotary adjusting movement about axis 14 relative to shank 13, but be retainable in any desired relative rotary position by tightening of a set screw 21 carried by collar 20 inwardly against the shank.

At its axially inner end, section 11 of the tool may have a circular recess 22 centered about axis 14, and about which there are formed on section 11 a series of typically identical teeth 23 extending and spaced circularly about axis 14. These teeth project axially inwardly (downwardly in FIGS. 1, 2 and 3).

At the center of recess 22, section 11 of the tool carries an insert holding shank 123, which has an upper externally threaded end portion 24 screwed into an internally threaded passage 25 in section 11. A set screw 26 may be provided for rigidly locking shank 123 in section 11. The lower end of shank 123 carries a second set of external threads 27 which mate with and are adapted to be screwed into internal threads 28 within an insert 29 which is to be installed. Axially, intermediate its upper and lower threaded ends, shank 123 preferably has an enlargement 30, which may be cylindrical as shown and centered about axis 14, and has an upper transverse surface 31 functioning as a stop surface for holding the tool in assembled condition.

The insert 29 is typically illustrated as a self-tapping insert, having external threads 32 which are adapted to be screwed into an initially unthreaded bore 33 (FIG. 1) in a carrier part 34. As threads 32 are screwed into bore 33, they form internal threads in the bore as indicated at 35 in FIG. 2.

Disposed about shank 123, the tool 10 includes a second main section 36, which is desirably essentially tubular in shape and centered about the same axis 14 as are the shank and other parts of the tool. More specifically, section 36 may have an upper externally and internally cylindrical tubular portion 37, of an external diameter corresponding to surface 18 of section 11, and of an internal diameter at 38 corresponding to the diameter of section 11 at 39 which defines the junction between the periphery of recess 22 and the inner sides of teeth 23. At its lower end, element 36 tapers to a reduced diameter portion 40 which may have internal and external cylindrical surfaces 41 and 42, and which has a transverse end surface 43 engageable with outer end surface 44 of the insert. The internal diameter at 41 of portion 40 of section 36 may be slightly larger than the external diameter of the received portion of shank 123.

The upper end of portion 37 of section 36 has a series of teeth 45 formed thereon and spaced circularly and evenly about axis 14. These teeth 45 engage the previously mentioned teeth 23 of section 11, and may be identical with those teeth. The individual teeth have surfaces 46 which are inclined to advance both circularly and axially, preferably advancing more rapidly in a circular direction than in an axial direction, so that upon rotation of upper section 11 and its teeth 23 relative to lower section 36, the lower section 36 is cammed by surfaces 46 axially inwardly or downwardly. In the figures, it is assumed that the threads 27, 28 and 32 are all right hand threads, so that section 11 is turned in a right hand direction to screw the insert into the carrier part. This right hand rotation of section 11 acts through cam surfaces 46 to the cam section 36 downwardly as discussed. Reverse or left hand rotation of section 11 acts through camming surfaces 46 to release section 36 for upward axial retracting movement relative to section 11.

Teeth 46 have the discussed camming surfaces 46 at first sides thereof, and at opposite sides of the teeth have surfaces 47 which are engageable to limit the mentioned rotation of section 11 relative to section 36 in a left hand or unscrewing direction. These second side surfaces of the teeth preferably extend more directly axially than do the inclined surfaces 46, thus giving to the two sets of teeth the essentially ratchet form configuration apparent from FIG. 1. In the optimum arrangement, surfaces 46 extend axially, and lie within axial planes which contain main axis 14 of the tool. The engaging surfaces 46 and 47 of the two sets of teeth extend radially from the diameter at location 39 in FIG. 3 to the diameter of surface 18 at the aligned surface 48 of section 36.

Section 36 is yieldingly urged rotatively relative to section 11 in the rotary direction in which shank 123 is unscrewed from the insert, that is, in a left hand direction in the particular form of tool illustrated in the drawing. This result is attained by means of a coil spring 49 which is disposed about and closely proximate to cylindrical surfaces 18 and 48 of the two sections, and is connected at its upper end 50 to collar 20 and at its lower end 51 to section 36. As will be apparent in FIG. 3, such connection of the ends of the spring to the mentioned parts is attained by providing an axially turned end at 50 which projects into an axially extending recess 52 in collar 20, and a radially turned end 51 which extends into a radially extending recess or opening 53 in section 36. Thus, coil spring 49 acts to urge section 36 to the position illustrated in FIG. 1, in which inclined camming surfaces 46 of the two sets of teeth are urged against one another, to cam section 36 downwardly, leaving opposed surfaces 37 of the two sets of teeth spaced apart and out of engagement.

The inner cylindrical surface 38 of section 36 contains an annular groove 54 (FIG. 3), which contains a snap ring 55 constructed to project radially inwardly far enough to engage shoulder surface 31 of enlargement 30 of the shank, and thereby limit downward movement of section 36 relative to section 11. More particularly, this stop shoulder structure formed by elements 30 and 55 prevents downward movement of section 36 beyond the position illustrated in FIGS. 1 and 3, and thereby maintains teeth 23 and 45 always in axially interfitting relation, so that the two sections can rotate only between the position of FIG. 1 and a position in which shoulders 47 of the section engage one another.

Describing now the manner of use of the tool, assume first of all that the tool is in the condition of FIG. 1, in which the inclined surfaces 46 of the teeth are held against one another by spring 49. The insert 29 is then screwed onto the downwardly projecting end of shank 27, until the upper end of the insert engages shoulder 43. Next, the tool is manipulated to the position of FIG. 1, and section 11 is then simultaneously rotated about axis 14, and advanced downwardly along that axis, to screw the insert into the carrier part to the position of FIG. 2. During such installation of the insert, rotary forces are transmitted from section 11 to section 36 through the interengaging inclined cam faces 46 of the two sets of teeth, and downward force is transmitted to the insert through shoulder 43 which engages the upper end of the insert. When the insert reaches the fully installed position of FIG. 2, the user halts the right hand advancing rotation of section 11, and reverses that rotation to turn the section 11 in a left hand unscrewing direction. The initial portion of this left hand rotary motion breaks the tight engagement between the two sets of teeth 23 and 45 at inclined surfaces 46, and thereby frees section 36 for upward axial retracting movement relative to section 11 (and slightly away from insert 29—see FIG. 2), to thereby break the theretofore tight binding engagement between section 36 and the insert at surfaces 43 and 44. As a result, there is no tendency to unscrew the insert with the tool, and the left hand unscrewing rotation of section 11 may be continued unhampered until threaded portion 27 of shank 123 has been completely withdrawn from the insert. As soon as section 36 has moved away from engagement with the insert, as shown in FIG. 2, spring 49 immediately becomes effective to turn section 36 to its original position of FIG. 1 relative to section 11, so that in normal operation of the tool the surfaces 47 of the teeth do not usually engage. However, if for any reason the two sections 36 and 11 do turn relatively far enough to bring the shoulders 47 of one section into engagement with the shoulders 47 of the other section, such engagement of the shoulders limits this relative rotation positively. Collar 20 may be adjusted, as permitted by set screw 21, to vary the yielding force exerted by spring 49 to any desired value for best attaining the discussed type of operation. If shank 123 becomes worn or damaged, it may be easily unscrewed from section 11, following which snap ring 55 may be constricted against the tendency of its own resilience for removal from groove 54, thus freeing shank 123 for removal and replacement.

I claim:

1. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first teeth on said first section projecting axially inwardly and spaced circularly apart about said axis, and a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section.

2. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first teeth on said first section projecting axially inwardly and spaced circularly apart about said axis, and a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section, said two sets of teeth having additional surfaces which interfit axially with one another and are engageable in a relation limiting rotation of said first section relative to said second section in said unscrewing direction.

3. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first teeth on said first section projecting axially inwardly and spaced circularly apart about said axis, a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section, and means yieldingly urging said second section in said unscrewing rotary direction relative to said first section.

4. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first teeth on said first section projecting axially inwardly and spaced circularly apart, a set of second teeth on said second section projecting axially outwardly toward and engaging said first teeth and spaced circularly apart, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section, and a coil spring disposed about at least one of said sections and connected at opposite ends to said sections respectively and yieldingly urging said second section in said unscrewing rotary direction relative to said first section.

5. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first essentially ratchet form teeth on said first section projecting axially inwardly and spaced circularly apart about said axis, and a set of second essentially ratchet form teeth on said second section projecting axially outwardly toward and engaging said first teeth and spaced circularly apart about said axis, said teeth of the two sets having camming surfaces at first sides thereof which are inclined to advance circularly as they advance axially and which engage in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the other section, said teeth of the two sets having stop surfaces at second sides thereof which extend approximately axially and more directly axially than said camming surfaces and are engageable in a relation limiting rotation of said first section relative to said second section in said unscrewing direction.

6. A tool for screwing a threaded element into a carrier part including a first section adapted to be turned about an axis, means carried by said first section forming an axially inwardly projecting shank having external threads for threadedly engaging said element in driving relation, a second section mounted for rotation with said first section and for limited rotary motion relative thereto about said axis, means forming a shoulder disposed about said shank for engaging axially inwardly against said element and transmitting axially inward force from said second section to said element, a set of first teeth on said first section projecting axially inwardly and spaced circularly apart about said axis, and a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section.

7. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first teeth on said first section projecting axially inwardly and spaced circularly apart about said axis, a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section, and stop shoulder means limiting relative axial separation of said sections and preventing such separation far enough to move said two sets of teeth out of axially interfitting relation.

8. A tool for screwing a threaded element into a carrier part including a first section adapted to be turned about an axis, means carried by said first section forming an axially inwardly projecting shank having external threads for threadedly engaging said element in driving relation, a second section mounted for rotation with said first section and for limited rotary motion relative thereto about said axis, means forming a shoulder disposed about said shank for engaging axially inwardly against said element and transmitting axially inward force from said second section to said element, a set of first teeth on said first section projecting axially inwardly and spaced circularly apart about said axis, a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section, means forming a second shoulder on said shank, and a snap ring contained in and carried by said second section and engageable with said second shoulder in a relation limiting axial separation of the two sections, and preventing such separation far enough to move said two sets of teeth out of axially interfitting relation.

9. A tool for screwing a threaded element into a carrier part including a first section adapted to be turned about an axis, means carried by said first section forming an axially inwardly projecting shank having external threads for threadedly engaging said element in driving relation, a second essentially tubular section mounted about said shank for rotation with said first section and for limited rotary motion relative thereto about said axis, means forming a shoulder disposed about said shank for engaging axially inwardly against said element and transmitting axially inward force from said second section to said element, a set of first essentially ratchet form teeth on said first section projecting axially inwardly and spaced circularly apart about said shank and said axis, a set of second essentially ratchet form teeth on said second section projecting axially outwardly toward and engaging said first teeth and spaced circularly apart about said shank and said axis, said teeth of the two sets having camming surfaces at first sides thereof which are inclined to advance circularly as they advance axially and which engage in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the other section, said teeth of the two sets having stop surfaces at second sides thereof which extend approximately axially and more directly axially than said camming surfaces and are engageable in a relation limiting rotation of said first section relative to said second section in said unscrewing direction, spring means yieldingly urging said second section in said unscrewing rotary direction relative to said first section, and stop shoulder means limiting relative axial separation of said sections and preventing such separation far enough to move said two sets of teeth out of axially interfitting relation.

10. A tool for screwing a threaded element into a carrier part including a first section adapted to be turned about an axis, means carried by said first section forming an axially inwardly projecting shank having external threads for threadedly engaging said element in driving relation, a second essentially tubular section mounted about said shank for rotation with said first section and for limited rotary motion relative thereto about said axis, means forming a shoulder disposed about said shank for engaging axially inwardly against said element and transmitting axially inward force from said second section to said element, a set of first essentially ratchet form teeth on said first section projecting axially inwardly and spaced circularly apart about said shank and said axis, a set of second essentially ratchet form teeth on said second section projecting axially outwardly toward and engaging said first teeth and spaced circularly apart about said shank and said axis, said teeth of the two sets having camming surfaces at first sides thereof which are inclined to advance circularly as they advance axially and which engage in a relation camming said section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the other section, said teeth of the two sets having stop surfaces at second sides thereof which extend approximately axially and more directly axially than said camming surfaces and are engageable in a relation limiting rotation of said first section relative to said second section in said unscrewing direction, spring means yieldingly urging said second section in said unscrewing rotary direction relative to said first section, an enlargement on said shank forming a stop shoulder within said second section, and a snap ring carried within a groove in the interior of said tubular second section and engageable axially inwardly against said stop shoulder to limit axially inward movement of said second section relative to said first section and thereby prevent axial separation of said two sets of teeth out of interfitting relation.

11. A tool for screwing a threaded element into a carrier part including a first section adapted to be turned about an axis, means carried by said first section having threads for threadedly engaging said element in driving relation, a second section mounted for rotation with said first section and for limited rotary motion relative thereto about said axis, means forming a shoulder for engaging axially inwardly against said element and transmitting axially inward force from said second section to said element, a set of first teeth on said first section projecting axially inwardly and spaced circularly apart about said axis, a set of second teeth on said second section projecting axially outwardly toward and engaging said first teeth and spaced circularly apart about said axis, at least some of the individual teeth having camming surfaces which are inclined to advance circularly as they advance axially and which engage others of the teeth in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the first section, and a spring yieldingly urging said second section in said unscrewing rotary direction relative to said first section, means connecting a first end of said spring to one section, and means connecting a second end of the spring to the other section adjustably to enable adjustment of the spring tension.

12. A tool for screwing a threaded element into a carrier part including a first section adapted to be turned about an axis, means carried by said first section forming an axially inwardly projecting shank having external threads for threadedly engaging said element in driving relation, a second essentially tubular section mounted about said shank for rotation with said first section and for limited rotary motion relative thereto about said axis, means forming a shoulder disposed about said shank for engaging axially inwardly against said element and transmitting axially inward force from said second section to said element, a set of first essentially ratchet form teeth on said first section projecting axially inwardly and spaced circularly apart about said shank and said axis, a set of second essentially ratchet form teeth on said second section projecting axially outwardly toward and engaging said first teeth and spaced circularly apart about said shank and said axis, said teeth of the two sets having camming surfaces at first sides thereof which are inclined to advance circularly as they advance axially and which engage in a relation camming said second section axially toward and against said element in response to relative rotation of the first section in a direction to advance said element into the carrier part, whereby upon rotation of said first section in a reverse unscrewing direction said inclined camming surfaces release said second section and shoulder for axial retracting movement relative to the other section, said teeth of the two sets having stop surfaces at second sides thereof which extend approximately axially and more directly axially than said camming surfaces and are engageable in a relation limiting rotation of said first section relative to said second section in said unscrewing direction, spring means yieldingly urging said second section in said unscrewing rotary direction relative to said first section, an enlargement on said shank forming a stop shoulder within said second section, said spring means including a coil spring disposed about said two sections and about said two sets of teeth and connected at its opposite ends to said sections respectively, and a snap ring carried within a groove in the interior of said tubular second section and engageable axially inwardly against said stop shoulder to limit axially inward movement of said second section relative to said first section and thereby prevent axial separation of said two sets of teeth out of interfitting relation.

13. A tool as recited in claim 12, including a collar disposed about and rotatably adjustable relative to said first section, means for locking said collar in fixed adjusted position relative to said first section, and means for connecting one of said ends of the spring to said collar to said first section, and means for connecting one of said ends of the spring to said collar to thereby connect said end to said first section through the medium of the collar.

References Cited by the Examiner

UNITED STATES PATENTS 1,849,212   3/1932   Winther _____ 192—46
2,949,800   8/1960   Neuschotz.

WILLIAM FELDMAN, *Primary Examiner.*

G. WEIDENFELD, *Assistant Examiner.*